Figure 6:
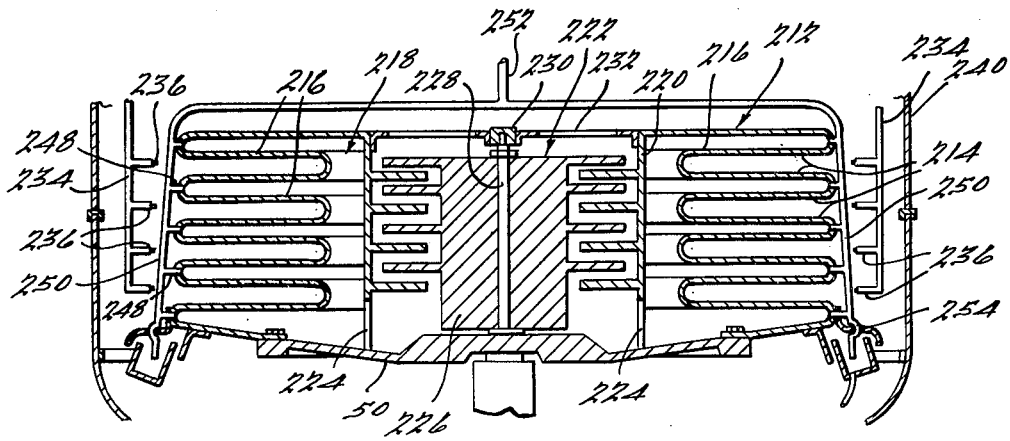

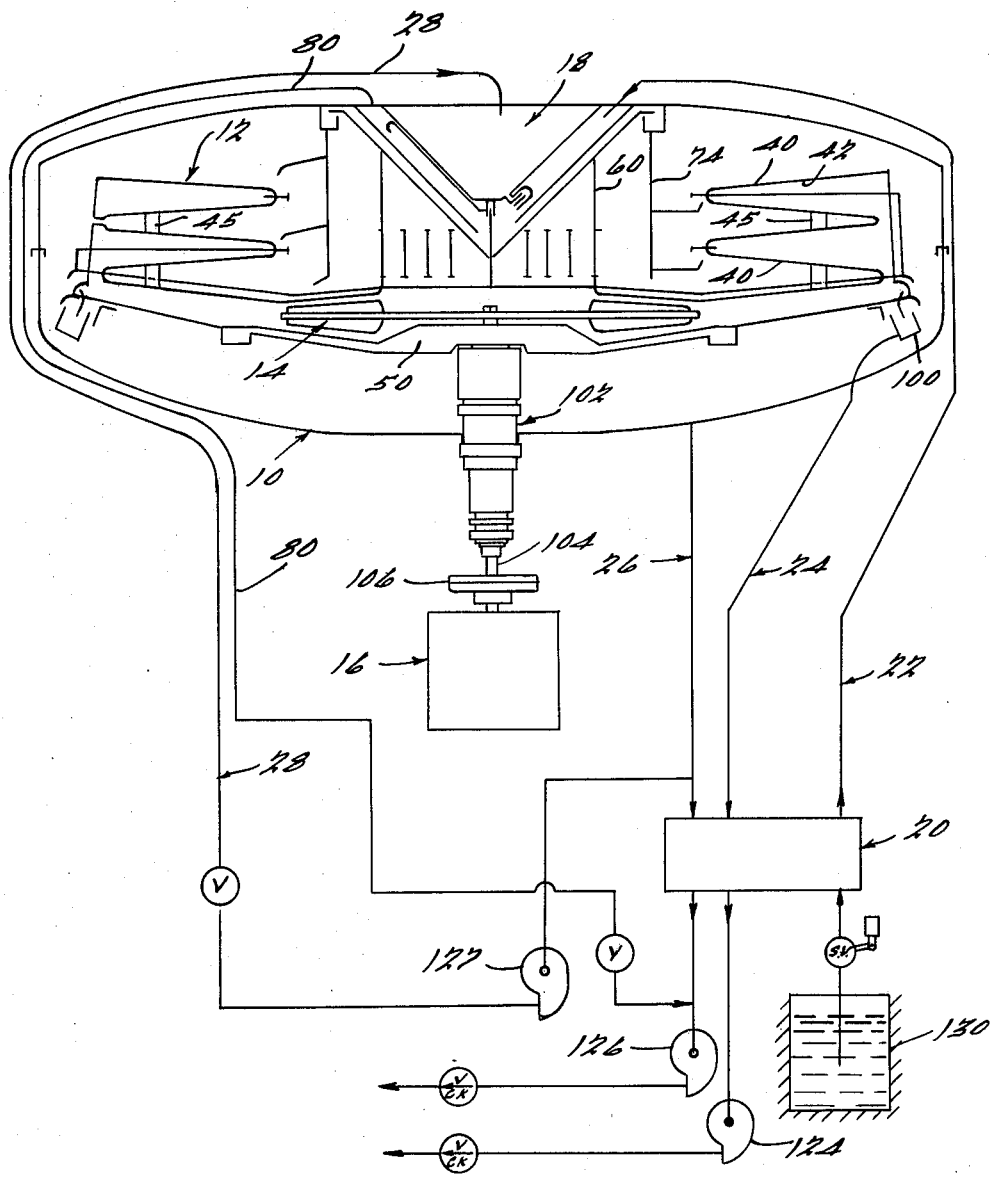

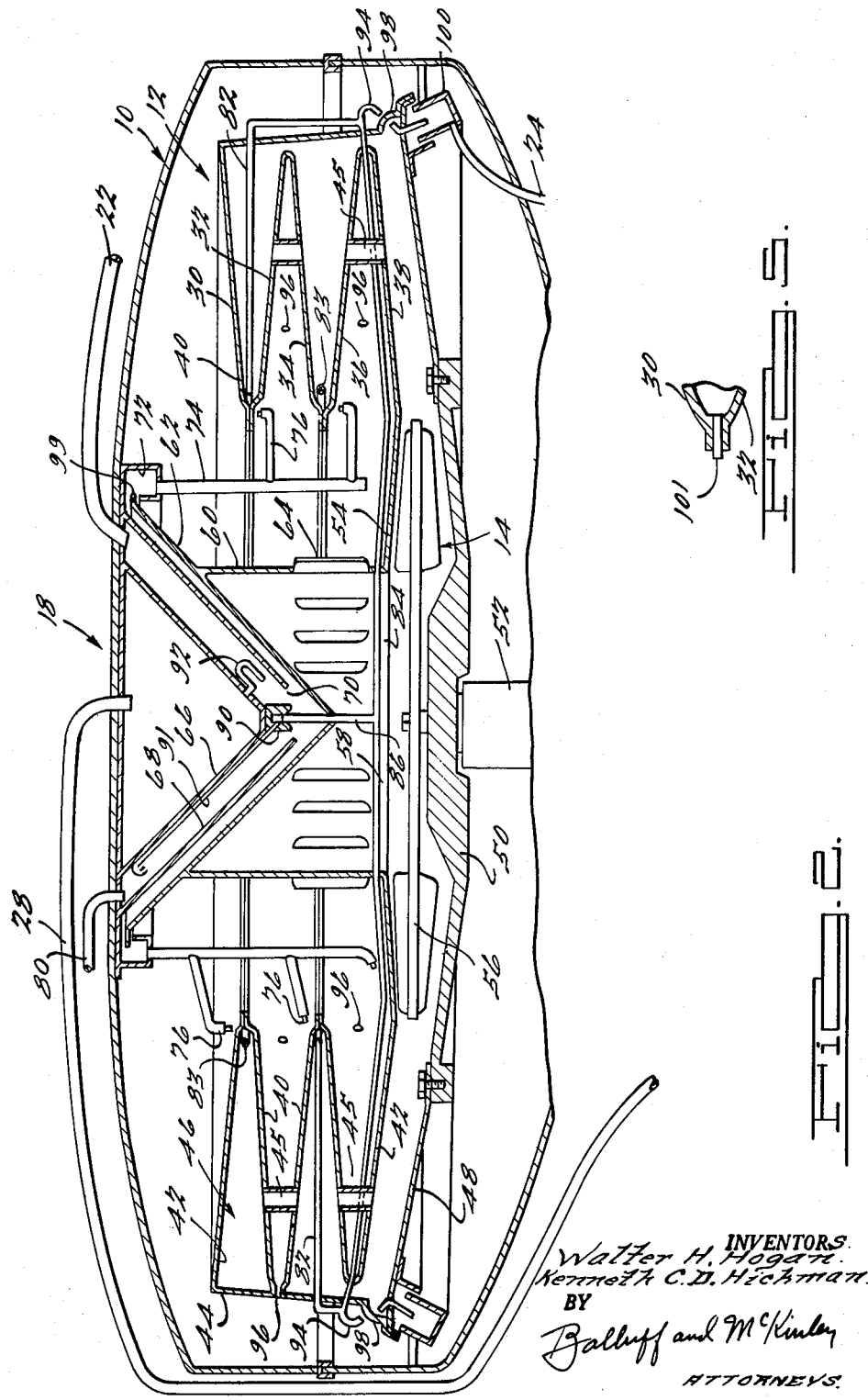

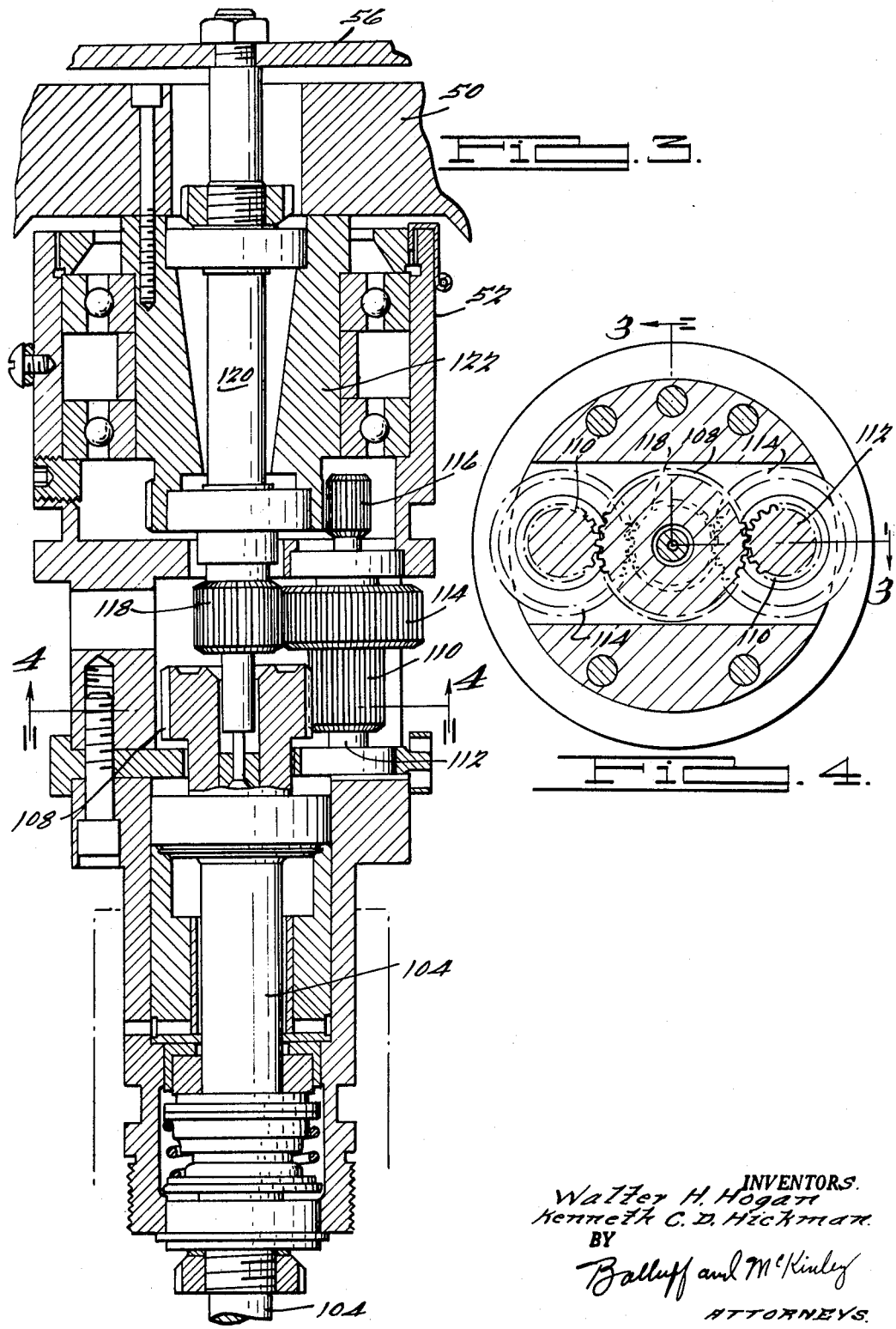

INVENTORS.
Walter H. Hogan
Kenneth C.D. Hickman
BY
Balluff and McKinley

United States Patent Office

3,200,050
Patented Aug. 10, 1965

3,200,050
THERMAL COMPRESSION STILLS
Walter H. Hogan, Wayland, Mass., and Kenneth C. D. Hickman, Rochester, N.Y., assignors, by mesne assignments, to Aquastills Incorporated, Rochester, N.Y., a corporation of New York
Filed Apr. 14, 1960, Ser. No. 22,237
8 Claims. (Cl. 202—176)

This invention relates to thermal compression stills and has particular reference to certain novel and useful improvements in thermal recompression distillation, particularly of saline water, which contribute to increased efficiency, compactness, and economy of construction, and which are applicable to small machines of this type which may be made entirely automatic in operation.

The invention is particularly concerned with centrifugal barrier compression stills of the kind disclosed in U.S. Patent No. 2,734,023, wherein the crude distilland, such as crude water or saline water, is fed onto one side of a thermally conducting annular plate or disc in rapid rotation where it is whirled across the surface in a thin layer. The steam evolved from such layer is picked up and conveyed by a compressor to the reverse side of the plate at about 10% higher pressure, passing the latent heat of condensation through the plate to maintain the process in continuous positive heat balance and continuous operation.

A principal object of the invention is to provide a novel, efficient, and economical construction for a compression still.

Another object of the invention is to provide in a compression still, a phase separation barrier and heat exchanger having a compressor integral therewith and driven at a higher speed than the barrier and heat exchanger.

Another object of the invention is to provide a compression still having a rotary phase separation barrier and heat exchanger comprising a stack of annular evaporating and condensing surfaces with a condensing chamber and compressor integral therewith.

Another object of the invention is to provide a phase separation barrier and heat exchanger incorporating a stack of heat exchange surfaces and in which steam is fed to the condensing surfaces through channels between the outer and inner peripheries of the stack.

Another object of the invention is to provide a driving arrangement for a rotary phase separation barrier and heat exchanger and the associated compressor of a compression still so that the essential parts of the still may be driven from a single shaft and the compressor rotor may be rotated at a substantially higher speed than the heat exchange structure.

Another object of the invention is to provide in a compression still a novel and efficient arrangement for degassing the feed and purging non-condensibles from the condensing chamber.

Other and further objects of the invention will be apparent from the following description and claims and may be understood by reference to the accompanying drawings, of which there are four sheets, which by way of illustration show preferred embodiments of the invention and what we now consider to be the best mode of applying the principles thereof. Other embodiments of the invention may be used without departing from the scope of the present invention as set forth in the appended claims.

Figure 7:
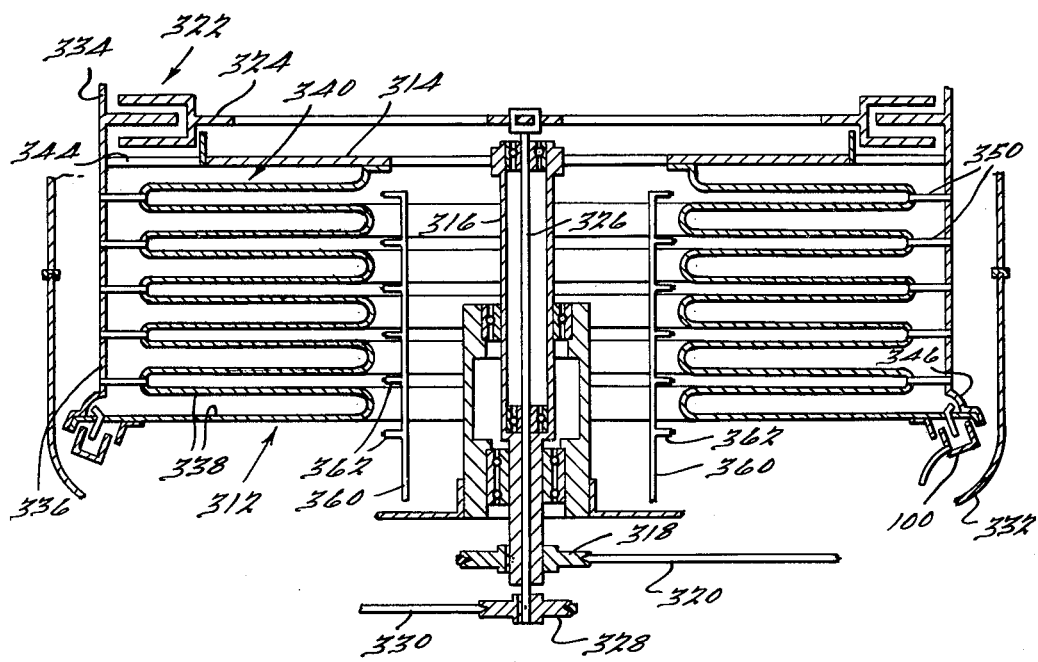

In the drawings:
FIG. 1 is a schematic view of a compression still embodying the invention;
FIG. 2 is an enlarged fragmentary sectional view of the rotary heat exchange and phase separation barrier and the associated compressor;

FIG. 3 is a sectional view of the driving arrangement for the rotary heat exchange structure and the rotor of the compressor taken along the line 3—3 of FIG. 4;
FIG. 4 is a sectional view taken along the line 4—4 of FIG. 3;
FIG. 5 is a fragmentary sectional view illustrating a modified arrangement for purging non-condensibles from the condensing chamber;
FIG. 6 is a fragmentary sectional view schematically illustrating a modification of the invention; and
FIG. 7 is a fragmentary sectional view schematically illustrating a further modification of the invention.

As illustrated in FIG. 1, a compression still embodying the invention comprises a casing 10, a hollow rotary annular phase separation barrier and heat exchanger 12, a compressor 14, a motor 16 for driving the phase separation barrier and heat exchanger 12 and the compressor 14, a degasser 18, a heat exchanger 20, a feed conduit 22 arranged to supply feed to the still, a distillate conduit 24 arranged to withdraw distillate from the still, a residue conduit 26 arranged to withdraw residue from the still, a conduit 28 for recirculating part of the residue through the still, and conduit 80 communicating with the degasser 18 for removing gas from the still. The conduits 22, 24 and 26 pass through the heat exchanger 20 where the hot residue and the distillate streams are brought into heat exchange relation with the feed or distilland for recovering heat from the distillate and residue.

The conduit 80 forms part of a system for degassing the feed and purging the condensing side of the still of non-condensibles. The degassing and purging system for the still may be of the type disclosed in Hickman U.S. Patent No. 2,899,366, or any other suitable degassing and purging system may be employed.

As illustrated in FIG. 2, the rotary phase separation barrier and heat exchanger structure 12 is disposed in a pressure-tight enclosing casing 10 for rotation about a vertical axis and comprises a stack of horizontally disposed annular members or discs 30, 32, 34, 36 and 38 of high thermal conductivity joined in series, the interior surfaces 40 forming a stack of evaporating surfaces and the exterior surfaces 42 forming condensing surfaces. A cylindrical wall 44 surrounds the members 30, 32, 34, 36 and 38 and is associated therewith so as to form a rotary condensing chamber 46 which includes the space to which the condensing surfaces 42 are exposed. The cylindrical wall 44 at one end is joined to the outer periphery of the member 30 and at its other end to an annular disc-like member 48 which is secured upon a disc 50 which is rotatably mounted upon the housing 52 of the power transmission which drives the rotary structure 12. The member 38 projects inwardly beyond the other members, as indicated at 54, so that the annular portion 54 and the opposite annular surface of the disc 50 form the chamber of a compressor 14 in which the rotor or centrifugal impeller 56 is arranged. The inner periphery of the portion 54 defines an inlet 58 into the compressor, while the space between the annular members 38 and 48 forms a radial discharge outlet from the compressor chamber into the condensing chamber 46.

The condensing chamber 46 includes the space within the cylindrical wall 44 between the condensing surfaces 42 and the space between the condensing surface 42 on the underside of the disc 38 and member 48 so that the compressor discharges into one end of the condensing chamber from which the steam passes around the outer periphery of the members 38, 36, 34 and 32 and/or through axially extending tubes 45 into the balance of the condensing chamber for contact with and condensation upon the condensing surfaces 42.

The portion 54 at its inner periphery may be made integral with an axially extending sleeve or baffle 60 which forms a support for a cone 62, the apex of which projects downwardly into the interior of the heat exchange structure 12. The sleeve 60 is provided with a series of louvers 64 forming openings through which steam from the evaporating surfaces 40 passes into the interior of the sleeve 60 and thence through the inlet 58 to the compressor 14 while preventing transmission of spray. The space to which the evaporating surfaces are exposed forms an evaporating chamber from which the compressor 14 withdraws steam through the inlet 58 and discharges it after compression into the compression chamber 46.

The feed supply conduit 22 discharges distilland into the degasser 18 in the space between conical members 66 and 68, the latter having an opening 70 at the bottom through which liquid flows onto the inner surface of the cone 62 which functions as a spreader and discharges the liquid into the annular feed gutter 72. Pipes 74 depending from the gutter 72 and supplied with liquid therefrom are provided with nozzles 76 positioned so as to discharge liquid onto the evaporating surfaces 40 and completely wet the same as the rotary structure 12 is rotated at a high speed—say, for example, at 1400 r.p.m.

Gas separated from the distilland in the degasser 18 is removed through a conduit 80 which is connected to a suitable evacuating means, such as the residue evacuating line 26, or an evacuating system as disclosed in Hickman 2,899,366. A purging system for the condensing chamber 46 includes purge tubes 82 each looped as indicated at 83 at its inner end around the inner periphery of the condensing chamber and extending through the wall 44 and connected to a cross conduit 84 from which riser tube 86 extends through the cone 62 freely into an inverted cup-shaped member 90 carried on the underside of the stationary conical member 66. Loops 83 are suitably apertured to withdraw non-condensibles from the condenser. A tube 91 mounted on cone 66 and having returned bend 93 at its upper end conducts purge gas from member 90 to a region adjacent gas removal conduit 80 whereby purge steam from the condensing chamber 46 may be removed from the still. A tube 92 carried by the member 66 and including a liquid trap provides a means for delivering recirculated residue from the interior of the conical member 66 into the stream of distilland flowing downwardly through cone 68. At its outer ends the cross conduit 84 is provided with looped ends 94 which form a liquid trap.

More than enough distilland is supplied to the evaporating surfaces 40 so as to completely wet the same, and the residue is discharged from the evaporating surfaces through a series of orifices 96 which extend through the condensing chamber 46 and the wall 44 whereby the residue is centrifugally discharged against the interior wall of the casing 10 and collects in the bottom thereof, from which it is removed through the conduit 26. The steam supplied to condensing chamber 46 by compressor 14 condenses in the condensing chamber 46 on the condensing surfaces 42, and the condensate is centrifugally discharged therefrom against the interior surface of the wall 44 and thence through the liquid traps 98 into the stationary annular gutter 100. The open side of the gutter 100 is suitably baffled so as to exclude spray within the casing therefrom, and the traps 98 serve to maintain the pressure differential established by the compressor 14 between the condensing chamber 46 and the interior of the gutter 100 which is exposed to the pressure prevailing within the casing 10 which is open to the evaporating side of the still.

There is a slight running clearance or seal between the outer peripheral annular flange 99 of the rotating cone 62 and the adjacent edge of the gutter 72 through which a small amount of steam from the evaporating side of the still is bled into the degasser 18 due to the pressure difference prevailing, and such steam flows in countercurrent contact with the outwardly flowing distilland on the inner surface of the cone 62 to effect further degassing of the distilland, and such steam together with the gas liberated from the distilland flows upwardly through the opening 70 into the space between the cones 66 and 68 for removal through the gas conduit 80.

In lieu of using the purge tubes 82, 84, 86 and 91, the inner periphery of the condensing chamber adjacent the joints between the annular members 30 and 32 and the annular members 34 and 36 may be provided with a series of purge tubes 101, as shown in FIG. 5, through which non-condensibles from the inner periphery of the condensing chamber may be continuously bled into the evaporating side of the still. The bleeding of steam from the evaporating side of the still into the degasser 18 as just described will serve to continuously remove non-condensibles from the evaporating side of the still.

The rotary structure 12 is rotatably supported within the casing 10 by a power transmission indicated generally at 102 which extends externally of the casing 10 and which includes a rotary shaft 104 driven from the motor 16 through a clutch 106. As shown in FIGS. 3 and 4, the shaft 104 is journaled within the housing 52 and at its upper end is provided with a gear 108 in mesh with gears 110. The gears 110 are each fixed on a rotary shaft 112 upon which gears 114 and 116 are also fixed. Gears 114 mesh with gear 118 fixed on rotary shaft 120 which at its upper end has mounted thereon the rotor or impeller 56 whereby the latter may be rotated at an appropriate speed within the chamber of the compressor 14. The gears 116 mesh with the gear teeth on a hollow rotary shaft 122 concentric with the shaft 120 and journaled in the housing 52, shaft 120 being journaled in shaft 122. At its upper end the hollow shaft 122 has the disc 50 suitably affixed thereto for rotation therewith whereby the rotary structure 12 may be rotated at an appropriate speed. The motor 16 may be an electric motor adapted to turn the shaft 104 at a speed so as to effect the rotation of the rotary structure 12 at high speed and the rotation of the rotor 56 of the compressor at a higher speed. We find it desirable to rotate the rotor 56 at about 12,000 r.p.m. and the rotary structure 12 at about 1400 r.p.m.

The rotary structure 12 is rotated at a speed sufficient to continuously apply centrifugal force to distilland on the evaporating surfaces 40 so as to spread and flow such distilland continuously on the evaporating surfaces in a film substantially thinner than that which can be secured by a flow of such distilland of the same throughput on the same surface flowing under the force of gravity alone, and we contemplate that the force applied to the distilland will be at least ten times gravity and preferably about one thousand times gravity. Such rotation of the rotary structure will also serve to centrifugally discharge the residue from the evaporating surfaces through the orifices 96 thereby separating the residue from the distilland, and such rotation will also centrifugally discharge condensate from the condensing surfaces 42 as it condenses thereon against the interior of the annular wall 44 and thence through the traps 98 into the annular gutter 100 for removal from the still through the conduit 24 and the heat exchanger 20.

Conduit 24 may be connected to the intake of an evacuating pump 124 whereby the distillate may be pumped from the gutter 100. The residue is removed from the bottom of the casing 10 where it collects through the conduit 26 and the heat exchanger 20, and a pump 126 may be connected to such conduit for withdrawing residue therethrough. The conduit 28 may include a pump 127 and be connected to the residue conduit 26 so that part of the residue may, if desired, be returned to the still through the conduit 28 by the pump 127 for mixture in the degasser 18 with crude distilland supplied through feed conduit 22. The conduit 80 may be connected to the conduit 26 on the intake side of pump 126 so as to remove the gas from the degasser 18. 130 represents a source of crude or saline water for rectification in the still, and it should be noted that the conduit 22 passes through the heat exchanger 20 whereby the input is preheated by heat absorbed from the effluents from the still.

While forming no part of the invention, there may be associated with the still a thermostatically controlled space heater or other suitable source of heat (not shown) to bring the still to operating temperature and to assist in maintaining it there by intermittent operation during cold weather or when the still is supplied by colder than usual feed water. It is also desirable to have associated with the still a pump or other means for reducing the pressure within the casing 10. The rotor 12 is the heart of the still and with the integral compressor 14 accomplishes the purification of the crude water. In operation the rotor spins at about 1400 r.p.m. and the compressor rotor at about 12,000 r.p.m. while crude water is fed to the evaporating surfaces. By this means the water is spread in thin, rapidly moving films of high heat transfer capacity on the evaporating surfaces 40, and the steam spontaneously discharged therefrom is pumped by the compressor 14 into the condensing chamber where, because of the higher pressure prevailing, it condenses on the inner surfaces of the rotor. The latent heat of condensation passes through the heat exchanger walls and supplies the heat required for evaporation. The efficiency of the still depends on the smaller than customary pressure difference that permits useful rates of distillation. To utilize these small differences, the still is preferably operated approximately at the saturation pressure of pure water that corresponds with the temperature selected.

We have found it useful to operate the still at a temperature in the range from 100° to 140° F., the preferred region being 120° to 130° F. The temperature of the feed may be anywhere from freezing to 100° F. Preferably the evaporation is carried out under a partial vacuum which corresponds more or less to the saturation pressure of pure water at the prevailing temperatures.

In the modification as schematically illustrated in FIG. 6, the rotary annular phase separation barrier and heat exchanger indicated generally at 212 is constructed the reverse of FIG. 2 so that the annular evaporating surfaces 214 are on the outside of the barrier while the annular condensing surfaces 216 are on the inside, and the annular condensing chamber 218 is arranged within the barrier 212. The barrier and heat exchanger structure 212 may be of the type of construction illustrated in FIG. 2 and provides a stack of annular evaporating surfaces 214 on one side of the barrier and a stack of annular condensing surfaces 216 on the other side. A cylindrical wall 220 joined to the end walls of the barrier cooperates with the barrier to define the central condensing chamber 218. In this instance an axial flow compressor 222 is disposed within the cylindrical wall 220 and forms a means for pumping steam from the evaporating side of the still into the condensing chamber 218, the lower end of the wall 220 being provided with radial openings 224 through which the compressed steam is discharged by compressor 222 into the condensing chamber 218. The rotor 226 of the compressor is mounted upon a shaft 228 which corresponds with the shaft 120 except that the shaft 228 is extended farther in view of the difference in the compressor. The upper end of the shaft 228 is journaled in a bearing 230 supported upon a spider 232 carried by the barrier structure 212, the center of the spider forming an inlet to the compressor.

The axial flow compressor 222 includes vanes on the rotor 226 and vanes carried by and rotatable with the wall 220 which cooperate due to the difference in speed of rotation of the rotor 226 and the wall 220 to compress the steam and pump it from the evaporating side to the condensing side of the still. The shaft 228, like the shaft 120, is rotated at a much higher rate of speed than the disc 50 which is driven by the other shaft of the transmission as shown in FIGS. 3 and 4. The rotor 226 may turn in the same direction as the barrier 212, or it may turn in the opposite direction so as to thereby increase the speed differential between the rotor 226 and the part of the compressor which rotates with the barrier 212. The barrier 212 is suitably supported on the rotary disc 50 which is supported and rotated in accordance with the construction disclosed in the previous modification.

As the evaporating surfaces 214 are on the outside, the feed pipes 234 which may be stationary or rotate with the barrier are disposed outwardly of the barrier and are provided with a series of nozzles 236 for discharging jets of distilland onto the annular evaporating surfaces at their inner periphery. The residue is centrifugally discharged from the evaporating surfaces against the interior wall of the casing 240 and collects in the bottom thereof as in the previous modification.

The condensate is discharged from the condensing surfaces 216 through passages provided by tubes 248 into collecting pipes 250, the lower ends of which discharge into stationary annular gutter 100, while the upper ends of the pipes 250 are joined to a pipe 252 through which non-condensibles may be removed from the condensing chamber in a manner similar to that illustrated in FIG. 2. The lower ends of the pipes 250 include liquid traps 254 so as to maintain the pressure differential on the opposite sides of the barrier 212.

In view of the necessity of discharging the distilland onto the inner periphery of the evaporating surfaces, the same is discharged from the nozzles 236 under sufficient pressure to accomplish this purpose, and this may necessitate the use of a pump for supplying the distilland to the feed pipes 234 from the degasser.

The still shown in the modification of FIG. 6 includes a degasser, such as the degasser 18 of FIG. 2, and also a circular baffle like the baffle 60 of FIG. 2 for preventing the entrance of spray into the compressor 222. However, in view of the fact that in the modification of FIG. 6 the compressor 222 occupies the space at the center of the rotary structure 212, the degasser and rotary baffle 60 of FIG. 2 would be disposed above the rotary structure.

As in the case of FIG. 2, the rotary structure 212 is rotated by the shaft which drives the disc 50 at a speed sufficient to continuously apply centrifugal force to distilland on the evaporating surfaces of a magnitude many times in excess of the force of gravity so as to spread and flow such distilland continuously on the evaporating surfaces in a film substantially thinner than that which can be secured by a flow of such distilland of the same throughput on the same surface flowing under the force of gravity alone and so as to centrifugally discharge condensate from the condensing surfaces as it condenses thereon and so as to centrifugally discharge residue from the evaporating surfaces.

In all of the modifications, the axis of the still is disclosed as vertical but this need not necessarily be so. While the specific form of degasser and purging arrangement is especially useful in the types of construction illustrated, it is contemplated that other forms of degassers and purging arrangements may be employed.

In the modified structure schematically illustrated in FIG. 7, the rotary annular phase separation barrier and heat exchanger indicated generally at 312 is arranged similar to FIG. 2 so that the evaporating surfaces thereof are on the inside and the condensing surfaces on the outside, as in FIG. 2, and the stack of annular evaporating and condensing surfaces may be provided by the type of construction as illustrated in FIG. 2. The barrier 312 includes an annular end plate or member 314 which is carried by the rotary shaft 316 having a pulley 318 on its lower end adapted to be driven by a belt 320. In this case the compressor 322, an axial flow compressor, includes a rotor 324 mounted on a rotary shaft 326 for rotation therewith, the shaft 326 being journaled within the shaft 316 and having a pulley 328 on its lower end adapted to be driven by a belt 330. The pulleys 318 and 328 are disposed outside of the casing 332 and driven at appropriate but different speeds so as to carry out the distillation process in a fashion similar to that of the still as shown in FIG. 2, and as noted in connection with the modification of FIG. 6, the rotor 324 may be driven in a direction opposite that of the barrier 312. The other part 334 of the compressor 322 is mounted upon and carried by the barrier 312 so as to rotate therewith. An annular wall 336 cooperates with the annular condensing surfaces 338 on the outer side of the barrier 312 so as to define a condensing chamber 340 on the outer side of the barrier 312, and the compressor 322 is disposed at one end of the barrier 312 and with respect to the condensing chamber 340 so that the discharge outlet 344 from the axial flow compressor discharges into one end of the condensnig chamber 340.

The distillate from the condensing surface is centrifugally discharged therefrom against the annular wall 336 and collects in the annular gutter 346, from which it is discharged through the centrifugal traps into the stationary gutter 100. The residue from the evaporating surfaces is centrifugally discharged therefrom through the passages provided by the pipes 350 through the condensing chamber and the annular wall 336 and against the interior wall of the casing 332, in the bottom of which it collects as in FIG. 2. Distilland is supplied to the evaporating surfaces through the feed pipes 360 and the nozzles 362. The still of FIG. 7 may be provided with a degasser as in FIG. 2, and also with means similar to the baffle 60 for separating entrained spray from the steam before it passes into the compressor 322.

Except in the particulars noted, the construction and operation of the modifications illustrated in FIGS. 6 and 7 are the same as those illustrated in the initial modification.

While we have illustrated and described preferred embodiments of our invention, it is understood that these are capable of modification, and we therefore do not wish to be limited to the precise details set forth but desire to avail ourselves of such changes and alterations as fall within the purview of the following claims.

We claim:

1. In a thermal compression still for evaporating and condensing distillable liquid and having a phase separation barrier and heat exchanger structure of high thermal conductivity providing an evaporating surface on one side and a condensing surface on the opposite side, a degasser for the distilland including a rotatable member, means for supplying distilland onto said rotatable member, means for rotating said rotatable member so as to distribute the distilland thereon and to discharge the distilland therefrom, means for supplying the degassed distilland from said degasser to the evaporating surface, means for passing steam evolved in the still in contact with the distilland while the same is on said rotatable member, and means for withdrawing gas from said degasser.

2. In a compression still, a casing, a hollow rotary phase separation barrier and heat exchanger structure of high thermal conductivity disposed in and enclosed by said casing and providing a stack of annular evaporating surfaces on one side and annular condensing surfaces on the opposite side, said rotary structure including a pressure barrier wall cooperating with the condensing surfaces to define a condensing chamber within part of the space enclosed by said casing, a compressor including a compressor chamber which forms part of said rotary structure and has an inlet communicating with the space to which said evaporating surfaces are exposed, and an outlet arranged to discharge into said condensing chamber, a gutter disposed so as to receive distillate from said condensing chamber, a degasser including a rotor mounted on said structure so as to rotate therewith, means for supplying distilland to said rotor, a feed gutter disposed so as to receive liquid discharged from said rotor, distributing pipes supplied from said feed gutter and disposed so as to supply distilland to said evaporating surfaces, a conduit communicating with said degasser for removing gas separated from said liquid, means for rotating said rotary structure at a speed sufficient to continuously apply centrifugal force to distilland on said evaporating surfaces so as to spread and flow such distilland continuously on said evaporating surfaces and so as to discharge the residue from said evaporating surfaces, and so as to centrifugally discharge condensate from said condensing surfaces as it condenses thereon.

3. In a still for simultaneously evaporating and condensng distillable liquid, a casing, a hollow rotary phase separation barrier and heat exchanger structure of high thermal conductivity disposed in and enclosed by said casing and comprising a stack of annular evaporating surfaces on one side and condensing surfaces on the other, annular pressure barrier means cooperating with the condensing surfaces to define a condensing chamber within part of the space enclosed by said casing and spaced from said casing, means for supplying steam to said condensing chamber, a degasser including a rotary liquid spreader rotatable with said structure, means for supplying distilland to said degasser, a feed gutter disposed so as to receive distilland discharged from said spreader, distributing pipes supplied from said feed gutter and disposed so as to supply distilland to said evaporating surfaces, a gas removal conduit communicating with said degasser, means for rotating said rotary structure at a speed sufficient to continuously apply centrifugal force to said distilland on said evaporating surfaces so as to spread and flow such distilland continuously on said evaporating surfaces and so as to discharge the residue from said evaporating surfaces and so as to centrifugally discharge condensate from said condensing surfaces as it condenses thereon.

4. A still according to claim 3 including a purge conduit between said condensing chamber and said degasser.

5. In a compression still, a casing, a hollow rotary phase separation barrier and heat exchanger structure of high thermal conductivity disposed in said casing and comprising a stack of annular members one side of which form evaporating surfaces and the other condensing surfaces, pressure barrier means cooperating with the condensing surfaces to define a condensing chamber, a compressor chamber forming part of said structure and having an inlet communicating with the said evaporating surfaces and an outlet arranged to discharge into said condensing chamber, a degasser including a liquid spreader mounted on said structure so as to rotate therewith, means for supplying distilland to said spreader, a feed gutter disposed so as to receive liquid discharged from said spreader, distributing pipes supplied from said feed gutter and disposed so as to supply distilland to said evaporating surfaces, a conduit communicating with said degasser for removing gas separated from said liquid, means for rotating said rotary structure at a speed sufficient to continuously apply centrifugal force to distilland on said evaporating surfaces so as to spread and flow such distilland continuously on said evaporating surfaces and so as to discharge the residue from said evaporating surfaces and so as to centrifugally discharge condensate from said condensing surfaces as it condenses thereon, a rotor for said compressor, and means for driving said rotor at a higher speed than said rotary structure.

6. In a still for simultaneously evaporating and condensing distillable liquid, a casing, an annular rotary phase separation barrier and heat exchanger of high thermal conductivity disposed in and enclosed by said casing, pressure barrier means associated with said barrier so as to define a condensing chamber integral with said barrier, a compressor chamber integral with said barrier and having a discharge outlet into said condensing chamber, the surface of said barrier exposed to said condensing chamber comprising a condensing surface and the opposite surface of said barrier forming an evaporating surface, said compressor chamber having an inlet communicating with the space to which said evaporating surface is exposed, a rotor in said compressor chamber and operable to withdraw vapor from the evaporating side of the barrier, compress it, and discharge it into said condensing chamber, a rotary baffle upstream relative to said inlet for separating liquid from the vapor before entry of the latter into the compressor chamber, means to remove condensate from said condensing chamber, means for supplying distilland to said evaporating surfaces, means for rotating said phase separation barrier and heat exchanger at a speed sufficient to continuously apply to distilland on said evaporating surface centrifugal force of a magnitude many times in excess of the force of gravity so as to spread and flow such distilland continuously on said evaporating surface in a film substantially thinner than that which can be secured by a flow of such distilland of the same throughput on the same surface flowing under the force of gravity alone and so as to discharge the residue from said evaporating surface and so as to centrifugally discharge condensate from said condensing surface as it condenses thereon, and means for rotating said rotor at a speed substantially higher than that of said phase separation barrier and heat exchanger.

7. In a still for simultaneously evaporating and condensing distillable fluid, a casing, an annular rotary phase separation barrier and heat exchanger of high thermal conductivity disposed in and enclosed by said casing, annular pressure barrier means associated with said barrier so as to define a condensing chamber on one side thereof, said barrier and condensing chamber being disposed in surrounding relation, one around the other, said barrier including a stack of annular condensing surfaces exposed to said condensing chamber and the opposite side of said barrier forming evaporating surfaces, means communicating with said condensing chamber so as to remove condensate therefrom, means for supplying distilland to said evaporating surfaces, means including a compressor chamber integral with said barrier for supplying steam to said condensing chamber, means for rotating said phase separation barrier and heat exchanger at a speed sufficient to continuously apply centrifugal force to the distilland on said evaporating surfaces so as to spread and flow such distilland continuously on said evaporating surfaces in a film substantially thinner than that which can be secured by a flow of such distilland of the same throughput on the same surface flowing under the force of gravity alone and so as to centrifugally discharge condensate from said condensing surface as it condenses thereon, a rotor in said compressor chamber and means for driving said rotor at a speed substantially higher than said barrier, said still including conduit means disposed between the inner and outer peripheries of said annular condensing surfaces and extending axially of said stack for delivering steam to the condensing surfaces from one end of said stack.

8. In a compression still, a casing, an annular rotary phase separation barrier and heat exchanger of high thermal conductivity disposed in and enclosed by said casing and having a pressure barrier wall associated with said barrier so as to define a condensing chamber on one side of said barrier and independent of said casing, a compressor including a chamber having a discharge outlet into said condensing chamber and a rotor, the surfaces of said barrier exposed to said condensing chamber comprising condensing surfaces and the opposite surfaces of said barrier forming evaporating surfaces exposed to the space between said rotary barrier and casing, said compressor chamber having an inlet communicating with the space to which said evaporating surfaces are exposed, said compressor being operable to withdraw vapor from the evaporating side, compress it, and discharge it into said condensing chamber, means communicating with said condensing chamber so as to conduct condensate therefrom, means for supplying distilland to said evaporating surfaces, means for rotating said phase separation barrier and heat exchanger at a speed sufficient to continuously apply to the distilland on said evaporating surfaces centrifugal force of a magnitude many times in excess of the force of gravity so as to spread and flow distilland on said evaporating surfaces in a film substantially thinner than that which can be secured by a flow of such distilland of the same throughput on the same surface flowing under the force of gravity alone and so as to centrifugally discharge condensate from said condensing surfaces as it condenses thereon, means for rotating said rotor at a speed substantially higher than that of said phase separation barrier and heat exchanger, and a centrifugal degasser rotatable with the rotary phase separation barrier and heat exchanger for degassing the distilland before it is supplied to the evaporating surfaces.

References Cited by the Examiner

UNITED STATES PATENTS

| 1,213,596 | 1/17 | De Baufre | 202—75 |
| 1,766,699 | 6/30 | Von Staden et al. | 202—64 X |
| 1,865,425 | 7/32 | Bartling | 202—182 |
| 2,210,928 | 8/40 | Hickman | 202—236 X |
| 2,696,465 | 12/54 | Kittredge | 202—75 X |
| 2,734,023 | 2/56 | Hickman | 202—236 X |
| 2,899,366 | 8/59 | Hickman | 202—236 X |
| 2,996,439 | 8/61 | Glover | 202—236 |
| 3,000,795 | 9/61 | Goeldner | 202—75 |

FOREIGN PATENTS

| 684,095 | 11/39 | Germany. |
| 617,613 | 2/49 | Great Britain. |

NORMAN YUDKOFF, *Primary Examiner.*

MILTON STERMAN, RICHARD D. NEVIUS,
*Examiners.*